Patented Apr. 9, 1946

2,398,077

UNITED STATES PATENT OFFICE 2,398,077

BLOOD COAGULATING PRODUCT AND METHOD OF OBTAINING SAME

Harry P. Smith, Iowa City, Iowa, assignor to Parke, Davis & Company, Detroit, Mich., a corporation of Michigan No Drawing. Application April 29, 1940, Serial No. 332,397

8 Claims. (Cl. 195—62)

The invention relates to new highly active thrombin preparations capable of effective use in clotting blood, especially under conditions where previous thrombin preparations were of no practical utility. The invention also relates to methods for obtaining the highly purified and highly potent products mentioned as well as new intermediate thromboplastin and prothrombin preparations which may be utilized in such methods.

The products of the invention are obtained by a new combination of steps which may in general be described as a quantitatively controlled conversion into pure thrombin of a specially purified prothrombin by means of a thromboplastin substantially free of antithrombins.

Heretofore, thrombin preparations have always contained large quantities of impurities, especially antithrombins which act to destroy thrombin. Moreover, the procedures previously used have given products of such low potency and lack of stability that there have been serious objections to their use as practical commercial therapeutic preparations.

It is an object of the present invention to provide a thrombin preparation which is substantially free from antithrombins, is of high potency and practical stability, and which can be obtained by commercially practicable procedures.

A further object of the invention is the production of purified intermediate thromboplastin and prothrombin preparations which are antithrombin-free and are especially useful in the preparation of my new thrombin.

Another object of the invention is a method of quantitatively following and controlling the various steps in the production of highly purified thrombin. Other objects will be apparent from the description of the invention as given herein.

It is necessary in the preparation of thrombin to insure that substances originally present in the blood which tend to destroy the thrombin are eliminated as far as possible. These deleterious substances are herein designated as "antithrombins." Their presence has largely been responsible for the low potency and relative instability of the final products heretofore obtained. By carefully eliminating them, it is possible by the present invention to supply high potency thrombin of sufficient stability to make it a commercially practicable therapeutic preparation.

It is known that extracts of tissues, such as saline extracts of brain tissue and other body tissues, e. g. those from the lung and kidneys, contain a substance or activity which has been designated as thromboplastin. The thromboplastin preparations previously obtained have not been of sufficient purity for all purposes, because they contain a certain amount of substances, termed "antithrombins," which have the property of destroying thrombin. Thus, the previous thromboplastin preparations have proved to be unsatisfactory for use in obtaining stable thrombin preparations.

Another disadvantage of previously known thromboplastin preparations is that they will not completely dissolve in saline, for example, physiological saline (0.85% NaCl). This undesirable characteristic of incomplete solubility in saline is the more likely to be present, the more one tries to purify the thromboplastin preparation and eliminate antithrombins from the same. The numerous treatments, especially where these could not be properly controlled, always tended to denature the product and render considerable amounts of it insoluble in saline. For this reason, it has not been possible heretofore to prepare a thromboplastin which is not only completely free from antithrombins, but which is also completely soluble in saline.

I have found that salt precipitation of a tissue extract containing thromboplastin, when carried out at an alkaline pH, preferably pH about 9, with a plurality of such salt precipitations not to exceed about 5 times, gives a product which is not only free from antithrombins but which is completely soluble in dilute sodium chloride solution. Such a product is extremely valuable, since it can be used to prepare stable thrombin preparations which, prior to the present invention, could not be obtained by the use of the known thromboplastin extracts.

Heretofore it has been proposed to treat oxalated plasma with an adsorbent such as magnesium hydroxide for the purpose of adsorbing prothrombin from other substances present in the plasma. Such prothrombin preparations, like the thromboplastin preparations previously known, contain considerable amounts of antithrombins which are present in all blood and which act, even in traces, to quickly destroy thrombin.

I have found that when there is more than a certain minimum of antithrombin or other non-prothrombin plasma substances present, that magnesium hydroxide will adsorb the antithrombins along with the desired prothrombin. I have further found that by first treating the plasma or like prothrombin solution to remove therefrom a sufficient amount of antithrombins and/or associated non-prothrombin substances, it is there-after possible to use magnesium hydroxide and like adsorbents to preferentially adsorb the prothrombin, while leaving the last traces of antithrombin in solution. In this manner, the invention makes it possible for the first time to remove all of the antithrombin substances and obtain absolutely antithrombin-free prothrombin which is also free from calcium. Although this calcium-free prothrombin is preferred, especially as an intermediate product for the preparation of antithrombin-free thrombin, my new antithrombin-free prothrombin containing calcium is readily obtained simply by adding a calcium compound or salt to the calcium-free antithrombin-free prothrombin.

An important feature of my new process for obtaining antithrombin-free prothrombin, as described herein, is that it definitely excludes the use of calcium compounds. If calcium compounds are used, there is always great danger that the prothrombin will be converted into thrombin before the antithrombins can be completely separated, especially since tissue extract, thromboplastin, is always present in blood or plasma in sufficient quantities for this transformation to occur. Such a premature conversion of prothrombin into thrombin would give a thrombin product containing antithrombins. The action of the latter in destroying the former occurs so rapidly that such a thrombin preparation could have no practical utility.

I have also found that prothrombin is inactivated by thrombin, analogous to the known inactivation of trypsinogen by trypsin. Thus, in a process for obtaining prothrombin wherein use is made of calcium compounds, it is always to be expected that some of the prothrombin will be converted into thrombin which is then capable of inactivating large quantities or even all of the remaining prothrombin.

My invention avoids the difficulties and failure inherent in other methods and gives a new intermediate product which is very useful in the preparation of pure thrombin, namely, antithrombin-free prothrombin, and preferably antithrombin-free prothrombin which is also calcium-free. By the use of such a new intermediate I am also able to provide a new therapeutically and commercially useful potency-standardized and antithrombin-free thrombin of high clotting activity and stability.

In that step of my invention wherein the prothrombin is converted to thrombin, a variety of methods can be utilized by virtue of the fact that I am able to use my new prothrombin and thromboplastin, both of which are free from antithrombins. However, I prefer to quantitatively control the amounts of thromboplastin which are used with a given quantity of prothrombin, since I have found out for the first time that thromboplastin is used up during production of thrombin from prothrombin in a constantly definite proportion, that is, stoichiometrically, based upon the amount of prothrombin present. Such a quantitatively controlled conversion of prothrombin to thrombin, especially at the optimum concentration of calcium ions, is not only an advantage when utilizing antithrombin-free materials, but is also of advantage even when some antithrombins are present in both the thromboplastin and the prothrombin to be converted.

The stoichiometric nature of the conversion is a surprising discovery, since it was previously thought that thromboplastin acts like a catalyst or enzyme when prothrombin is converted to thrombin and that the quantity of thromboplastin with respect to prothrombin was relatively of little importance. I have further found that if too much thromboplastin is used it dilutes the final thrombin preparation by adding impurities to it and is also wasteful. Furthermore, if too little thromboplastin is used, then the yield of thrombin is lowered, because all of the prothrombin is not converted. Also, unconverted prothrombin is rapidly destroyed by the thrombin which has been formed.

Not only is it preferable to use the proper proportion of thromboplastin to prothrombin, when obtaining thrombin, but it is a distinct advantage to carry out the conversion at a pH from about pH 7 to about pH 8. This is best accomplished by the use of buffered solutions and especially by the use of imidazole as a buffer.

The invention will be illustrated by the following examples.

*Example 1.—Preparation of thromboplastin*

100 grams of fresh ground beef lung are mixed with 100 cc. of saline and allowed to stand with occasional stirring, for 48 hours at 5° C. The mixture is centrifugalized and the fluid obtained is diluted with an equal volume of saline. Any prothrombin present is removed by adding one-sixth volume of magnesium hydroxide suspension followed by centrifugalization.

The magnesium hydroxide suspension can be made by adding 25 cc. of concentrated ammonium hydroxide to 100 cc. of 20% magnesium chloride, decanting and washing the precipitate several times with water, centrifugalizing and suspending the packed precipitate in 30 cc. of saline.

After centrifuging off the magnesium hydroxide with its adsorbed prothrombin and other impurities, 100 cc. of ammonium sulfate solution saturated at 5° C. are added to each 100 cc. of the clear solution remaining. A precipitate of thromboplasin forms, is centrifuged off, and the precipitate dissolved in 100 cc. of saline. If desired, the precipitation can be repeated and the final precipitate dissolved in 15 cc. of saline and dialyzed against saline until free of ammonium sulfate. The saline solution of thromboplastin thus obtained is free from antithrombins and can be used in preparing thrombin as described below.

The saline thromboplastin solution can be evaporated to dryness, if desired, in a vacuum desiccator. The thromboplastin is completely soluble in saline. It will be noted that the magnesium hydroxide suspension used in preparing the thromboplastin of this example leaves the solution of thromboplastin at an alkaline pH (about pH 9 to pH 9.5) during the step of precipitation with ammonium sulfate. The thromboplastin obtained by this example is free from antithrombins and this can be demonstrated by mixing the product with measured amounts of thrombin and testing for destruction of thrombin, by any antithrombins, after a period of 10 hours.

Instead of evaporating the saline solution of thromboplastin of this example to dryness, it can first be dialyzed against pure water and then dried to give a purified, stable, antithrombin-free product which is completely soluble in saline.

*Example 2.—Preparation of prothrombin*

One part of 1.85% potassium oxalate solution is thoroughly mixed with 3 parts of freshly drawn ox blood. The oxalated plasma is obtained by centrifugation. The plasma is diluted to 10 times its volume with distilled water and its acidity adjusted to a pH of about 5.2–5.4, preferably pH 5.3, with 1% acetic acid. A pH less than 5 is to be avoided because it results in destruction of the prothrombin. After adjusting the pH, the plasma is allowed to stand 2 hours or more and the precipitate separated by decanting and then centrifuging the mixture.

The precipitate is suspended in oxalated saline (0.075% potassium oxalate in 0.86% NaCl) using about one-sixteenth of the volume of the original plasma with no adjustment of the pH. That is, about 200 cc. for each gallon of original plasma. The large bulky residue which remains undissolved is centrifuged off and discarded. The supernatant liquid is a solution of prothrombin which contains antithrombins. It is further purified as follows:

A magnesium hydroxide suspension in water is made, e. g. as described under Example 1, containing about 8 to 10 grams of magnesium hydroxide (dry weight) per 100 cc. of suspension. To 6 liters of prothrombin solution, preliminarily purified as described above, there is added with stirring 10 or 15 cc. of the magnesium hydroxide suspension. The presence of magnesium compound causes any fibrinogen in the prothrombin to precipitate, and it is removed mechanically as a stringy mass. There is no significant loss of prothrombin in this step.

After removing the fibrin, 1 liter of the magnesium hydroxide suspension is added if the prothrombin solution assays 750 units per cc. More of the suspension is added if the solution assays more than 750 units of prothrombin per cc. The number of units of prothrombin per cc. can be estimated by the method described below.

If too much magnesium hydroxide is used, the final product will contain too much inactive protein. On the other hand, if insufficient magnesium hydroxide is used, the yield of prothrombin will be greatly reduced. About 8000 units of prothrombin are adsorbed by a suspension of 0.085 gram (dry weight) of magnesium hydroxide. This quantity of magnesium hydroxide is preferably suspended in about 1 cc. of aqueous suspension.

The supernatant of the adsorption mixture is siphoned off and centrifuged from the magnesium hydroxide with its adsorbed prothrombin. The latter is then suspended in a volume of water equal to that of the original $Mg(OH)_2$ suspension, placed in a pressure vessel and shaken with carbon dioxide under pressure until no further carbon dioxide is used up. Usually this takes about 10 or 15 minutes. It is necessary to avoid heating by too rapid adsorption of $CO_2$ and failure to shake the suspension.

The decomposition of the magnesium hydroxide adsorbent with $CO_2$ under pressure has at least two important advantages. It reduces the volume of water in which the $Mg(OH)_2$ can be suspended and thus cuts down on the volume subsequently submitted to dialysis. For example, at ordinary pressures the equivalent of 10 cc. of $Mg(OH)_2$ would have to be suspended in 60–70 cc. of water, whereas it can be decomposed by suspending in 10 cc. of water if one works at 60 pounds of $CO_2$ pressure. This is very important for making large quantities of prothrombin. However, $CO_2$ at ordinary pressures may be used, even though the results are not as satisfactory. The other advantage is the rapidity with which decomposition takes place under pressure.

After desorbing the prothrombin with $CO_2$ it is present in the solution which is then dialyzed against water. The dialysis is continued until the ionic concentration is such that a precipitate will be produced by acetic acid at about pH 5.3. The concentration of magnesium ion at this point is probably below 0.005 M.

After the dialysis is complete, which may require a day or two, the prothrombin solution may contain some precipitated impurities which are centrifuged off or otherwise removed. The dialyzed prothrombin solution is then precipitated with acetic acid. I prefer to first dilute the prothrombin before adding the acetic acid. Usually distilled water is added to dilute it about 3 times. Enough acetic acid may be used to give a pH of about 5.3 and cause precipitation of practically all of the prothrombin. However, I find it advantageous to fractionally precipitate by first bringing the pH to about 5.65, centrifuging off the precipitate and then bringing the pH of the supernatant to about 5.3. The second precipitate at pH 5.3 contains less inert protein than the first precipitate. In any case, either of the precipitates, or all of them, can be used for conversion into the new thrombin product, since the prothrombin precipitates are of very high potency and are antithrombin-free.

The product of this example is gray in appearance, gives the common protein color tests and a strong positive orcinol reaction for carbohydrate. It is very soluble in water and saline. It has a potency of about 2000 or more units of prothrombin per milligram of nitrogen. Stated in another way, one cc. of a solution of the product containing 1 mg. of nitrogen will clot 2000 cc. or more of purified fibrinogen solution in 15 seconds. See the definition of a unit of prothrombin given below.

One unit of prothrombin can be defined as that amount which, when completely converted into thrombin, will clot 1 cc. of fibrinogen solution in 15 seconds. It must be kept in mind that this definition of a unit of prothrombin requires that the prothrombin and also the thromboplastin used for converting it into thrombin are antithrombin-free, otherwise the thrombin produced will be inactivated by antithrombins as fast as it is formed from the prothrombin. Since I have obtained for the first time antithrombin-free thromboplastin and prothrombin, it is apparent that these new intermediate products make possible for the first time an accurate quantitative control of the potency of prothrombin and thrombin preparations. This definition of a unit of prothrombin requires complete conversion to thrombin. This can only be assured by a leisurely conversion which requires that the thromboplastin and prothrombin be free from antithrombins.

Similarly, one unit of thrombin is defined as that amount of thrombin which will cause the clotting of 1 cc. of fibrinogen solution in 15 seconds.

*Example 3.—Preparation of thrombin*

The starting material for this example is a purified antithrombin-free prothrombin. For example, the final moist acetic acid precipitate from Example 2 is dissolved in saline, neutralized and converted into thrombin by addition of a calcium salt and a purified antithrombin-free thromboplastin such as that described above under Example 1. The thrombin and some impurities are precipitated by addition of a water miscible solvent such as acetone. The precipitate is then dissolved in water which leaves the impurities behind as an insoluble residue. After separating the thrombin solution from the insoluble impurities, the thrombin is precipitated out again with the aid of acetone, or acetone and ether, and dried in vacuo.

Instead of precipitating the thrombin with a solvent such as acetone, the reaction product from the mixture of calcium salt, purified prothrombin and thromboplastin is subjected to dialysis or electrodialysis against water until most of the calcium salt and sodium chloride are removed, the pH then brought to about 5.3 and the material which precipitates is removed and discarded. The solution is neutralized and dried, either by using acetone and ether, or simply by distilling off water under reduced pressure at room temperature.

Although numerous variations of the above method of converting the prothrombin to thrombin can be employed in accordance with the invention, I prefer to use the proper proportion of thromboplastin to prothrombin, as already mentioned above, and to carry out the conversion at a pH of from about pH7 to about pH 8. For instance, the prothrombin of Example 2 is added to a solution of 0.9% sodium chloride and 0.15% of calcium nitrate diluted with 5% of its volume of imidazole buffer. The imidazole buffer, which does not interfere with the action of calcium ion, is prepared by dissolving 1.72 grams of imidazole in 90 cc. of 0.1 NHCl and diluting to 100 cc. with water.

The saline solution of thromboplastin from Example 1 can be used and contains approximately 2.5% of organic solids, that is, about 25 mgs. of organic solids per cc. Before adding the thromboplastin to the saline solution of prothrombin and calcium salt, it is diluted 11 times with a solution containing 0.9% NaCl and 0.15% calcium nitrate. It is then added in amounts between approximately 2 times and 5 times the theoretical amount required to convert a given quantity of prothrombin into thrombin in accordance with the data given in my publication with Edwin T. Mertz and Walter H. Seegers at pages 604–609 of Proceedings of the Society for Experimental Biology and Medicine, volume 42 (1939). In this publication I show that the minimum weight of thromboplastin is 1 $\gamma$ for the conversion of 10 units of purified prothrombin into thrombin. Hence, for the best practical or commercial results, one should use about 2 to 5 times the minimum of thromboplastin. The quantity of thromboplastin thus calculated is added to the purified prothrombin in the presence of the imidazole buffered solution of pH about 7. The mixture is allowed to stand about 30 minutes or more, an equal volume of acetone is added and the thrombin centrifuged off, washed with acetone and ether and dried in vacuo. As already mentioned above, the dry thrombin can be redissolved in water using a small volume of solvent, the solution adjusted to a pH of about 5.3, any precipitate which forms centrifuged off, the supernatant neutralized and the purified thrombin obtained either by distilling off the water under reduced pressure at room temperature or by precipitating the supernatant with acetone and washing the precipitate with acetone and ether and drying in vacuo.

The dry thrombin of this example assays up to about 4000 units or more per mg. of nitrogen or about 560 units per mg. of organic solids. In other words, if a quantity of thrombin equivalent to 1 mg. of nitrogen is dissolved in 1 cc., it is capable of clotting about 4000 cc. of purified fibrinogen solution in 15 seconds under standardized conditions. The product is white in appearance, highly soluble in water, leaving no insoluble residue whatsoever, giving positive qualitative tests for protein and a strong orcinol test for carbohydrate.

The product of this example is remarkably stable. This is an especially valuable property. Previous thrombin preparations when made up in the form of solutions become inactive and impractical or unsafe to use within a period of about 15 minutes after their preparation. This instability of prior preparations was no doubt due to the high antithrombin content which rapidly destroyed the thrombin. Such great instability does not permit of the use of such preparations in surgery. At least ½ hour is necessary to sterilize thrombin solutions by filtration through a 3G 5 on 3 fritted Jena glass filter. I have found that other types of filters are not satisfactory because they adsorb the thrombin activity when an attempt is made to sterilize the solutions. This period of ½ hour or more necessary for sterilizing the thrombin solutions does not materially affect the utility of my thrombin solutions because I have found my solutions to be stable not only for a period of hours, but for days. Thus, one can prepare solutions of highly potent thrombin containing several thousand or more units per cc. for a considerable time before it is necessary to use the same.

When my thrombin is sprinkled on a wound in dry form or sprayed on the wound in the form of its solution, it stops bleeding by clotting the blood practically instantaneously. It is advantageous in dangerous oozing of blood during major operations, for example in operations on the brain, liver and bone.

Because of the direct and sudden action of thrombin preparations of this invention, they can be used in controlling bleeding of hemophiliacs thereby providing a valuable life saving preparation not previously obtainable.

The invention is not limited to the exact details and materials and conditions described in the examples, since these are merely illustrative of the invention and may be varied considerably by anyone skilled in the production of preparations of this type.

What I claim is:

1. Antithrombin-free thrombin in stable, sterile, solid form, capable of instantaneously clotting blood and soluble in water to form a solution stable at room temperature for at least a period of hours and capable of instantaneously clotting blood.

2. Potency-standardized and antithrombin-free thrombin stable in aqueous solution at room temperature for at least a period of hours and capable of instantaneously clotting blood.

3. Process for obtaining antithrombin-free thrombin which comprises reacting in an aqueous medium antithrombin-free thromboplastin with an antithrombin-free prothrombin in the presence of calcium ions.

4. In a process for the preparation of antithrombin-free from prothrombin, the step which comprises reacting in an aqueous medium the prothrombin with an antithrombin-free and completely saline soluble thromboplastin in at least the stoichiometrically required amounts for converting the prothrombin to thrombin.

5. In a process for the preparation of antithrombin-free thrombin, the step which comprises reacting in an aqueous medium a proportion equivalent to about 2 to 5 gamma of antithrombin-free and completely saline-soluble thromboplastin with each 10 units of antithrombin-free prothrombin in the presence of the optimum concentration of calcium ions at a pH of about 7 to 8.

6. Potency-standardized thrombin stable at room temperature for at least a period of hours and having a clotting activity of the order of 4,000 or more units per milligram of protein-derived nitrogen, one of said units being the amount of thrombin activity capable of causing clotting of 1 cc. of standardized purified fibrinogen solution in 15 seconds.

7. Antithrombin-free thrombin capable of instantaneous clotting of blood and of such high purity that, when diluted on the order of from about 100 times up to 1,000 or more times, it is still capable of clotting blood instantaneously.

8. An aqueous solution of sterile and substantially antithrombin-free thrombin capable of instantaneous clotting of blood and of such high purity that, when diluted on the order of from about 100 times up to 1,000 or more times, it is still capable of clotting blood instantaneously.

HARRY P. SMITH.